Nov. 22, 1966  C. G. STALL ETAL  3,286,744
POWER SAW GUIDE APPARATUS
Filed Aug. 3, 1964  2 Sheets-Sheet 1
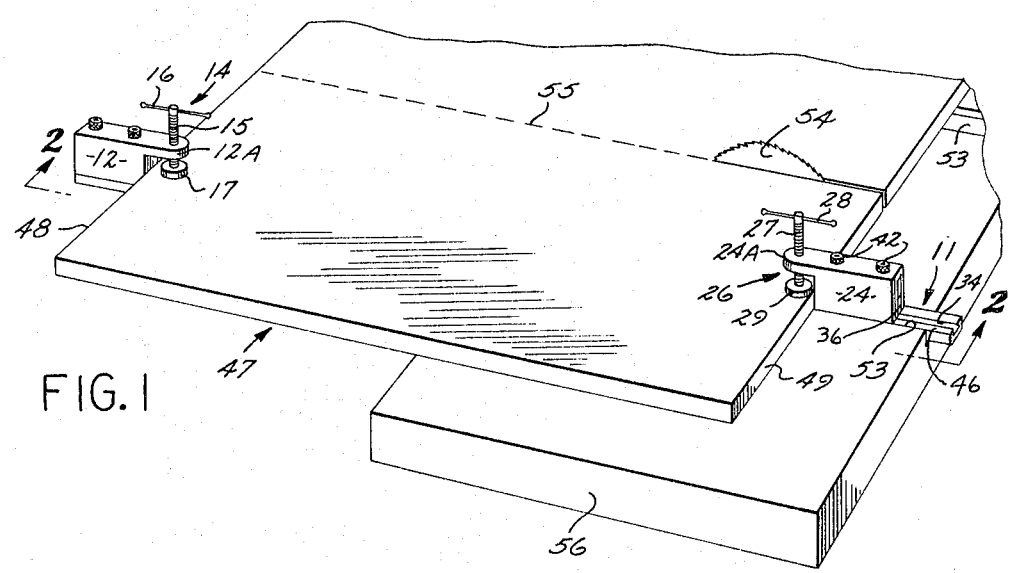
FIG. 1
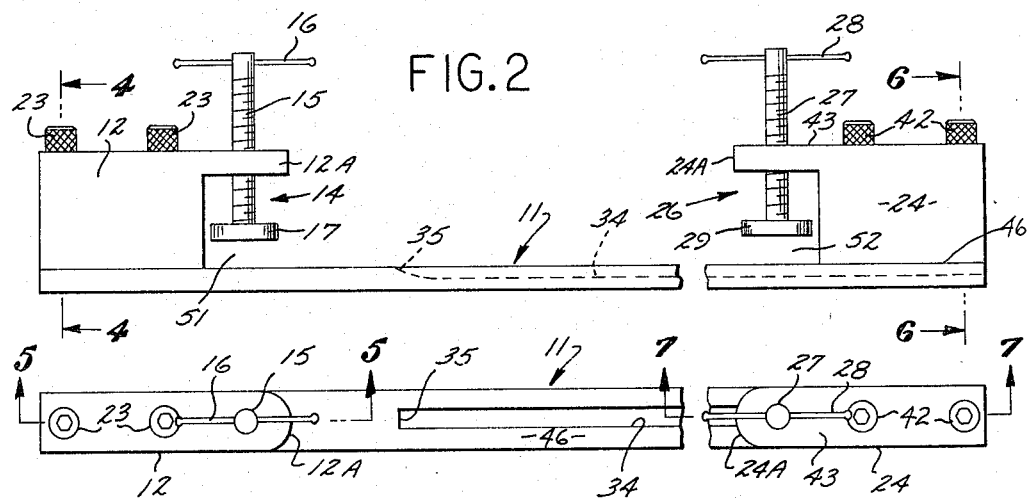
FIG. 2
FIG. 3
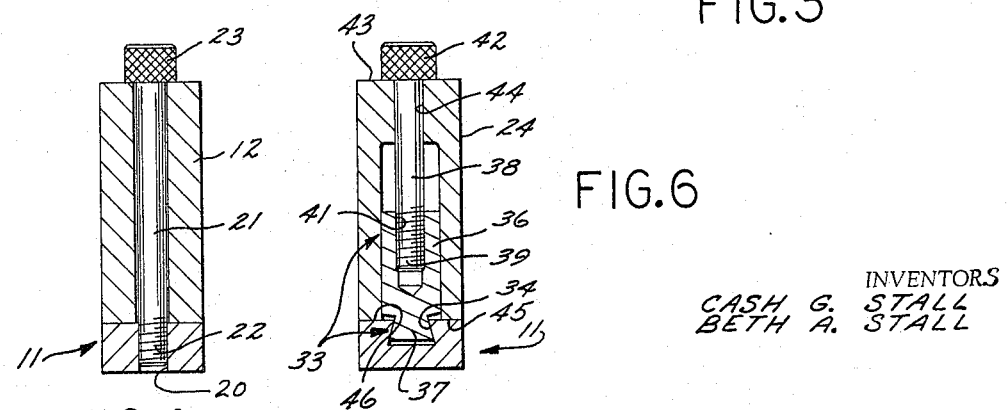
FIG. 4
FIG. 6
INVENTORS
CASH G. STALL
BETH A. STALL

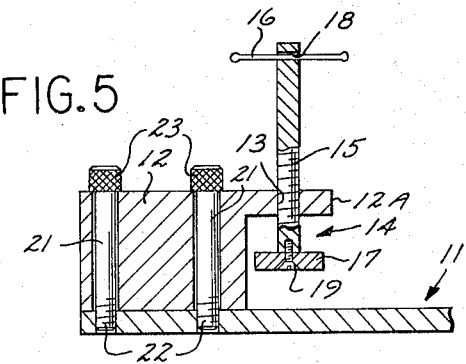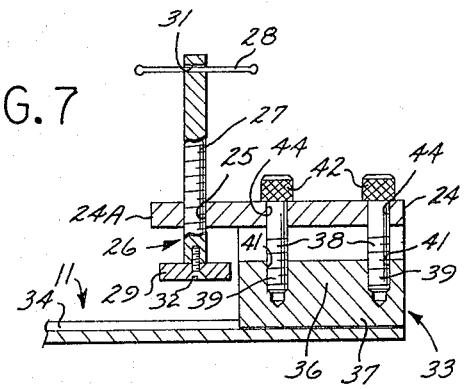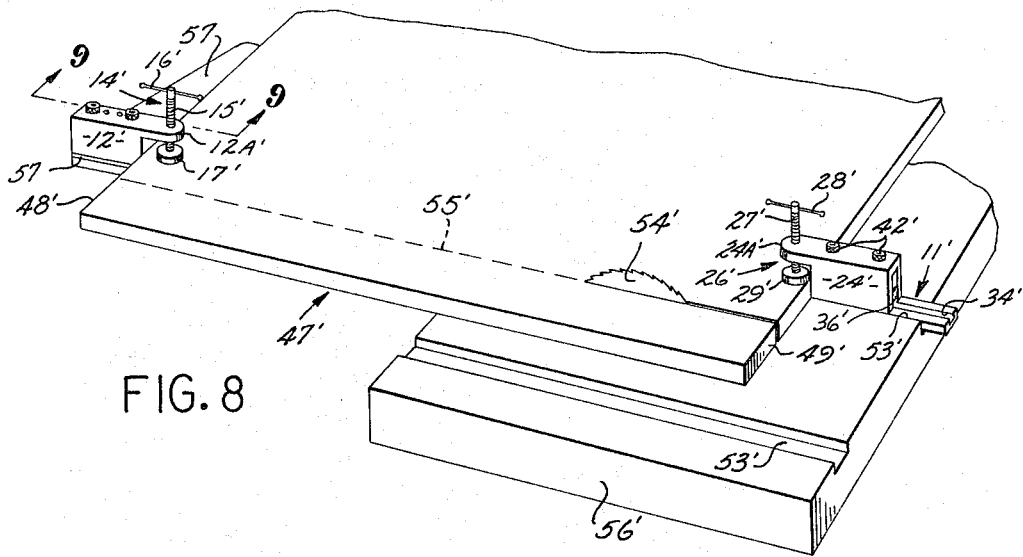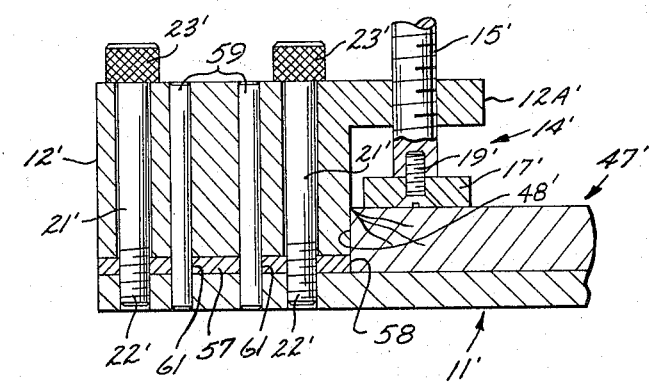

United States Patent Office 3,286,744
Patented Nov. 22, 1966

3,286,744
POWER SAW GUIDE APPARATUS
Cash G. Stall and Beth A. Stall, both of 2400
Manhattan Ave., Manhattan Beach, Calif.
Filed Aug. 3, 1964, Ser. No. 386,936
10 Claims. (Cl. 143—168)

Generally speaking, the present invention relates to power saw guide apparatus and, more particularly, pertains to power saw guide apparatus adapted for use with a power saw, such as a rotary table saw, a band saw, or any other equivalent type of power saw driven by a motor and having a saw table adapted to receive the workpiece which is to be sawed, and with said saw table having a longitudinal slot formed on the upper surface thereof and positioned parallel to, and laterally offset from, what might be termed a power saw blade cut-off line comprising the plane in which the power saw blade lies. Such longitudinal slots are conventionally provided in such power saw tables, and the novel power saw guide apparatus of the present invention is particularly adapted for slidable cooperation therewith while firmly holding a workpiece which is to be sawed in any desired relationship with respect to the above-mentioned power saw blade cut-off line, thus making it possible to controllably move the complete power saw guide apparatus or assembly of the present invention along said longitudinal slot in said power saw table so that the workpiece will be moved in a manner such as to have a desired cut-off line thereof coincident with the power saw blade cut-off line. This will provide exactly the desired type of end cut on the workpiece which may be at any desired position and at any desired angle with respect thereto. Also, it should be noted that the workpiece cut-off line may be very simply caused to have any desired position and/or angular relationship with respect to either edge of the workpiece by merely adjusting the position of the workpiece before causing same to be firmly fastened to the novel power saw guide apparatus or assembly of the present invention.

It should be noted that the novel apparatus of the present invention provides a very convenient and simple means for moving any workpiece (usually comprising a thin-sheet panel-like member, although not specifically so limited), whether of wood, plywood, plastic, metal, or any other suitable material, in a positively preselected and predetermined relationship with respect to a power-driven saw blade and in a manner which is extremely accurate and which requires virtually no guiding effort on the part of the operator even though very unwieldly workpieces are being sawed.

Furthermore, the apparatus of the present invention provides maximum safety for the operator since no socalled "kickback" danger is present at all in the positively guided arrangement provided by the present invention as opposed to the conventional free-hand guiding of a workpiece with respect to the power-driven saw blade.

It should be noted that the workpiece may be of virtually any desired shape.

Additionally, it should be noted that one or the other ends of the apparatus of the present invention may be provided with an angle guide member, if desired (which, in certain cases, may be a right angle guide member, although not specifically so limited), which can be at a predetermined angular relationship with respect to a longitudinal guide bar portion of the apparatus of the present invention which parallels the cut-off line, whereby to make it possible to position said angular guide member against any desired edge of a workpiece which is to be sawed, which will, of course, have the effect of causing the saw blade cut-off line and the workpiece cut-off line to be at said angular relationship with respect to said edge abutted by said angle guide member. For example, in the case where said angle guide member is perpendicular to said longitudinal guide bar and said perpendicular angle guide member is placed against one straight edge of a workpiece, the cut-off line will obviously be perpendicular to said abutted edge of said workpiece. This is, of course, merely illustrative of one exemplary form of the invention and is not to be construed as specifically limiting it.

With the above points in mind, it is an object of the present invention to provide a novel power saw guide apparatus capable of simple and easy cooperation with a conventional power saw table having at least one conventional longitudinal slot formed therein in a position laterally offset from, and parallel to, the cut-off line or plane of a power saw blade for the purposes briefly mentioned above and embodying any or all of the various features briefly mentioned above, although not specifically so limited in all forms of the invention.

It is a further object of the present invention to provide a novel power saw guide apparatus of the character referred to above, which acts to positively guide a workpiece with respect to a power-driven saw blade in a selected relationship and in a manner minimizing guiding effort on the part of an operator and maximizing safety for the operator.

It is a further object of the present invention to provide a novel power saw guide apparatus of the character referred to herein generally and/or specifically and including any or all of the features referred to herein, either individually or in combination, and which is of extremely simple, inexpensive construction requring a minimum of tooling and/or production costs and which is capable of mass manufacture at relatively low cost per unit whereby to be conducive to widespread manufacture, distribution, and use of the invention.

Further objects are implicit in the detailed description which follows hereinafter (which is to be considered as exemplary of, but not specifically limiting, the persent invention), and said objects will be apparent to persons skilled in the art after a careful study of the detailed description which follows.

For the purpose of clarifying the nature of the present invention, several exemplary embodiments are illustrated in the hereinbelow-described figures of the accompanying two sheets of drawings and are described in detail hereinafter.

FIG. 1 is a reduced-size, fragmentary, three-dimensional view illustrating one exemplary embodiment of the invention in operative relationship with respect to a saw table and power saw and with respect to a workpiece which is shown in the act of being cut along a desired cut-off line.

FIG. 2 is a larger-scale, fragmentary, partially broken-away view taken in the direction of the arrows 2—2 of FIG. 1, but with the workpiece, power saw table, and the power saw removed for reasons of drawing simplification and clarity and with a central portion of the longitudinal guide bar broken away and removed for space conservation reasons.

FIG. 3 is a top plan view of the apparatus of the present invention as shown in FIG. 2.

FIG. 4 is an enlarged sectional view taken in the direction of the arrows 4—4 of FIG. 2.

FIG. 5 is an enlarged fragmentary sectional view taken in the direction of the arrows 5—5 of FIG. 3.

FIG. 6 is an enlarged sectional view taken in the direction of the arrows 6—6 of FIG. 2.

FIG. 7 is an enlarged fragmentary sectional view taken in the direction of the arrows 7—7 of FIG. 3.

FIG. 8 is a fragmentary three-dimensional view quite similar to FIG. 1, but illustrates a very slight modification of the invention wherein one end of the longitudinal guide bar is provided with an angle guide member at a predetermined angle with respect thereto (in the example illustrated, perpendicular with respect thereto) for edge abutment with a corresponding edge of a workpiece which is to be sawed.

FIG. 9 is an enlarged fragmentary sectional view taken in the direction of the arrows 9—9 of FIG. 8 and is in many respects similar to FIG. 5 although it illustrates the modified form of the invention shown in FIG. 8 and shows the angle guide member in edge abutment with a workpiece (shown fragmentarily).

FIG. 10 illustrates a slightly modified form of operating handle portion for the two threaded clamp members and is to be understood as being applicable to either or to both of them as desired.

Generally speaking, the power saw guide apparatus of the present invention may be said to comprise a longitudinal guide bar, such as is generally designated at 11 and which is shown as being of rectangular cross-sectional configuration or shape, as is best illustrated in FIGS. 4 and 6, although not specifically so limited in all forms of the invention as will be referred to hereinafter.

The longitudinal guide bar 11 is provided at one end thereof with a clamp mounting member 12 having a vertically spaced portion 12A provided with an interiorly threaded aperture 13 threadedly carrying a vertically adjustable threaded clamp member, indicated generally at 14, and in the first exemplary form illustrated taking the form of an exteriorly threaded stud 15 provided with a laterally directed operating handle member 16 at the upper end thereof and a disc-shaped work abutment or contact member 17 at the lower end thereof. It will be noted that, in the example illustrated, the operating handle member or portion 16 comprises a cross bar slidably mounted in an aperture 18 in the upper end of the vertically adjustable threaded stud or clamp member 15, while the work abutment or contact member 17 is shown, in the example illustrated, as being fastened to the lower end of the threaded stud 15 by a fastening screw 19. However, this arrangement is merely exemplary, and various equivalent constructions and arrangements are within the broad scope of the present invention and are intended to be included and comprehended herein.

It will be noted that, in the example illustrated, the clamp mounting member 12 is firmly and rigidly fastened with respect to the underlying end portion of the longitudinal guide bar 11 by a pair of threaded fastening bolts or screws 21 having enlarged exteriorly knurled socket heads 23 and having threaded lower end portions 22 adapted to be received within the interiorly threaded holes 20. However, various other fastening means may be employed in lieu thereof.

The other or opposite end of said longitudinal guide bar 11 is provided with another clamp mounting member 24, similar in many respects to the previously mentioned and described clamp mounting member 12, and which has a vertically spaced portion 24A provided with an interiorly threaded aperture 25 threadedly carrying a vertically adjustable threaded clamp member indicated generally at 26 and, in the first exemplary form illustrated, taking the form of an exteriorly threaded stud 27 provided with a laterally directed operating handle member 28 at the upper end thereof and a disc-shaped work abutment or contact member 29 at the lower end thereof. It will be noted that, in the example illustrated, the operating handle member or portion 28 is similar to the previously described one shown at 16 and comprises a cross bar slidably mounted in an aperture 31 in the upper end of the vertically adjustable threaded stud or clamp 27, while the work abutment or contact member 29 is shown in the example illustrated as being fastened to the lower end of the threaded stud 27 by a fastening screw 32. However, this arrangement is merely exemplary, and various equivalent constructions and arrangements are within the broad scope of the present invention and are intended to be included and comprehended herein.

At least one of the clamp mounting members, such as shown at 12 and at 24 in the exemplary first form of the invention, is provided with controllably lockable and unlockable slidable engagement coupling means effectively coupling same with respect to a corresponding end portion of the longitudinal guide bar 11 for controllable unlocking thereof and for relative longitudinal slidable movement of said clamp mounting member (12 or 24) along a limited portion of the length of said longitudinal guide bar 11, after which said slidable engagement coupling means is normally locked in a selected relative position thereof with respect to said longitudinal guide bar 11. This has the effect of controllably adjustably varying the longitudinal distance between the two previously described clamping members 14 and 26 for facilitating engagement thereof with corresponding edges of a workpiece which may have a length (or width) between the edges thereof adapted to be engaged by said clamping members 14 and 26 which may be anything between a predetermined minimum value and a predetermined maximum value.

In the exemplary first form of the invention illustrated, said controllably lockable and unlockable slidable engagement coupling means is actually carried by the right hand clamp mounting member 24 and effectively and controllably lockably and unlockably slidably couples said right clamp mounting member 24 with respect to a limited length of the right hand end portion of the longitudinal guide bar 11; said controllably lockable and unlockable slidable engagement coupling means being generally designated at 33 as is perhaps best shown in FIG. 6, and is shown as comprising a longitudinal retaining slot or keyway means 34 formed in the upper surface of the longitudinal guide bar 11 between the right end thereof and an intermediate terminal point designated by the reference numeral 35. Said slidable engagement coupling means generally designated at 33 also comprises a slider member 36 having a downwardly enlarged head 37 at the bottom thereof slidably and retainingly longitudinally inserted into said longitudinal retaining slot or keyway means 34 for relative longitudinal movement therealong.

It will be noted that, in the exemplary first form of the invention illustrated, both the longitudinal retaining slot or keyway means 34 and the downwardly enlarged head means 37 at the bottom of the slider member 36 are similarly shaped and are shown as being of substantially frusto-conical cross-sectional shape or configuration as is perhaps best shown in FIG. 6. This, of course, allows relative longitudinal slidable movement thereof but positively prevents any substantial degree of vertical movement of the slider member 36 with respect to the longitudinal guide bar 11. It should be noted that while the frusto-conical shape of the retainingly cooperable elements 34 and 37 just described provides an advantageous structure, the invention is not specifically limited to the frusto-conical configuration of said elements as shown in FIG. 6 but may be modified to take various other functionally equivalent forms which will act in a manner preventing substantial relative vertical movement thereof but freely allowing relative longitudinal slidable movement thereof. For example, said elements might be of inverted T shape or of various other substantially functionally equivalent shapes or configurations.

Also, the slidable engagement coupling means generally designated at 33 includes controllably releasable locking means for relatively locking the slider member 36 with respect to the longitudinal guide bar 11 in any selected position along the length of the longitudinal retaining slot or keyway means 34. In the exemplary first form of the invention illustrated, said controllably releasable locking means comprises a pair of threaded bolts or screws 38 having exteriorly threaded lower ends 39 threadedly received within interiorly threaded bores 41 carried by the slider member 36 and with said bolts 38 having enlarged exteriorly knurled socket heads 42 at their upper ends adapted for exterior abutment with the top surface 43 of the right hand clamp mounting member 24 after having passed through corresponding apertures 44 at the top thereof.

It will be understood that when the threaded studs 38, comprising the controllably releasable locking means referred to above, are rotated so as to shorten the adjustable threaded interconnections thereof with respect to the slider member 36, the enlarged head 37 at the bottom of the slider member 36 will be drawn upwardly against the longitudinal retaining slot or keyway means 34, which will act to effectively draw the enlarged heads 42 of said studs 38 downwardly against the top surface 43 of said right clamp mounting member 24 whereby to force the bottom edge surface portions 45 of the clamp mounting member 24 against the corresponding upper surface portions 46 of the longitudinal guide bar 11, which will effectively frictionally lock same together so as to firmly lock the entire right end clamp mounting member 24 in any selected relative longitudinal position along the length of the retaining slot or keyway means 34 between the right end thereof at the right end of the guide bar 11 and the intermediate terminus thereof as designated at 35.

The above-mentioned feature of the invention makes it possible to adjust the spacing between the two clamp members 14 and 26 for optimum clamping engagement with respect to opposite edges of a workpiece, such as is generally designated at 47 in FIG. 1, said opposite edges of said workpiece being designated at 48 and 49 in said FIG. 1 and being received within the two corresponding recesses 51 and 52 defined between the vertically spaced portions 12A and 24A of the two corresponding clamp mounting members 12 and 24 respectively so that the two clamps 14 and 26 can be threadedly advanced downwardly into rigid abutment with the top surface of the workpiece 47 while the bottom surface thereof is rigidly abutted by the upper surface 46 of the longitudinal guide bar 11.

Thus it will be understood that the complete apparatus of the present invention becomes firmly clamped to the workpiece 47 so that they effectively function as a unit, and when such is the case, the longitudinal guide bar 11 is then positioned in one of the conventional longitudinal slots, such as either of the two shown at 53 in FIG. 1, which is parallel to the power driven saw blade 54 and the saw blade cut-off line shown in phantom at 55 and at a predermined laterally spaced or offset distance therefrom. Then the entire assembly, comprising the apparatus of the present invention and the workpiece 47 clamped therein, is slidably moved along the longitudinal slot 53 so that the power driven saw blade 54 will cut the workpiece 47 along the cut-off line 55.

It will be understood that as long as the lateral spacing or offset distance between the power saw blade 54 and the longitudinal slot 53 in the power saw table 56 is known, the upper surface of the workpiece 47 may have the clamps 14 and 26 clamped thereto at exactly said offset distance from the desired cut-off line so that the workpiece 47 will be cut off exactly along the desired line. Furthermore, it should be noted that the clamps 14 and 26 and the guide bar 11 may be clamped with respect to the workpiece 47 in any desired position and in any desired angular relationship relative thereto whereby to cause the cut-off line 55 to be positioned exactly as desired as to location and as to angle.

FIGS. 8 and 9 illustrate a very slight modification of the first form of the invention, and therefore, similar reference numerals, primed, however, are used to designate similar parts. In this modification of the invention, the longitudinal guide bar 11' is provided adjacent to at least one end thereof (in the example illustrated, the left end thereof) with an angle guide plate or member, designated at 57, which has an inner straight edge 58 positioned in a desired angular relationship with respect to the longitudinal guide bar 11' (in the example illustrated, perpendicular thereto) and lying in a horizontal plane immediately above the top surface of the longitudinal guide bar 11' so that said inner straight edge 58 can be placed against the left edge 48' of the workpiece 47', which will cause the cut-off line 55' to be in a corresponding angular relationship with respect to the edge 48' of the workpiece 47'. Since, in the example illustrated in FIGS. 8 and 9, said inner straight edge 58 is perpendicular to the guide bar 11', this will guarantee that the cut-off line 55' will be perpendicular to the abutted edge 48' of the workpiece 47'. However, various other angular relationships are within the broad scope of the present invention.

In the exemplary form illustrated in FIGS. 8 and 9, positive maintenance of the desired angular relationship between the inner edge 58 of the angle guide member 57 and the angularly adjacent edge of the longitudinal guide bar 11' is provided by the use of a pair of dowels 59 tightly mounted in corresponding apertures 61. In certain cases the fastening bolts 21', which effectively fasten the rear end of the angle guide member or plate 57 between the bottom surface of the left clamp mounting member 12' and the corresponding upper surface of the guide bar 11', may provide sufficient angular immobilization of the angle guide member 57 and, in such cases, the positioning dowels 59 may be eliminated.

FIG. 10 illustrates a slight modification of either or both of the clamp members 14 and 26 of the first form of the invention (or of the element 14' and 26' of the second form of the invention), although this one is designated by the reference number 14" in FIG. 10. It will be noted that the operating handle members 16", which functionally corresponds to that shown at 16 or that shown at 28 in the first form of the invention (or at 16' or at 28' in the second form of the invention) and which may be used in lieu thereof, comprises a rigidly connected wing member in this modified form of the invention.

It should be noted that the height of each pair of clamp mounting members of the various versions of the invention such as those designated at 12 and 24 in the case of the first form of the invention may be modified as desired to enable the corresponding clamp members such as those shown at 14 and 26 in the first form of the invention, to be capable of clamping engagement with workpieces of different thicknesses.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

We claim:

1. Power saw guide apparatus comprising: a longitudinal guide bar having a bottom portion having a cross-sectional shape similar to a longitudinal slot formed in the upper surface of a saw table parallel to and laterally offset from a power saw blade and adapted to be slidably inserted into and received by said longitudinal slot for manually controlled movement along the length thereof, said longitudinal guide bar being provided with a clamp mounting member having a vertically spaced portion adjacent to one end thereof and provided with a controllably vertically adjustable clamp member adapted for controllably releasably clamping one edge portion of a workpiece in fixed relationship with respect to said clamp member and with respect to an underlying portion of said longitudinal guide bar, said longitudinal guide bar also being provided with a clamp mounting member having a vertically spaced portion adjacent to an opposite end thereof and provided with a controllably vertically adjustable clamp member adapted for controllably releasably clamping an opposite edge portion of said workpiece in a fixed relationship with respect to said clamp member and with respect to an underlying portion of said longitudinal guide bar, at least one of said clamp mounting members being provided with controllably lockable and unlockable slidable engagement coupling means effectively coupling same with respect to the corresponding portion of said longitudinal guide bar for controllable unlocking thereof and for relative longitudinal slidable movement of said clamp mounting member along said longitudinal guide bar and for subsequent locking of said slidable engagement coupling means in a selected relative position thereof with respect to said longitudinal guide bar for facilitating engagement of the corresponding one of said clamp members with the corresponding edge of said workpiece irrespective of the width of said workpiece between said longitudinally spaced clamp members.

2. Apparatus as defined in claim 1, wherein said slidable engagement coupling means comprises a first longitudinal retaining means carried by the upper surface of said longitudinal guide bar along at least a portion of the length thereof and a slider member having a downwardly directed second longitudinal retaining means at the bottom thereof slidably and retainingly cooperable with said first longitudinal retaining means for relative longitudinal movement therealong.

3. Apparatus as defined in claim 1, wherein said slidable engagement coupling means comprises a first longitudinal retaining means carried by the upper surface of said longitudinal guide bar along at least a portion of the length thereof and a slider member having a downwardly directed second longitudinal retaining means at the bottom thereof slidably and retainingly cooperable with said first longitudinal retaining means for relative longitudinal movement therealong, said slider member being provided with controllably releasable locking means for relatively locking same with respect to said longitudinal guide bar in any selected position along the length of said first longitudinal retaining means thereof.

4. Apparatus as defined in claim 1, wherein said slidable engagement coupling means comprises a first longitudinal retaining means carried by the upper surface of said longitudinal guide bar along at least a portion of the length thereof and a slider member having a downwardly directed second longitudinal retaining means at the bottom thereof slidably and retainingly cooperable with said first longitudinal retaining means for relative longitudinal movement therealong, said slider member being provided with controllably releasable locking means for relatively locking same with respect to said longitudinal guide bar in any selected position along the length of said first longitudinal retaining means thereof, said controllably releasable locking means comprising at least one threaded member threadedly and controllably adjustably interconnecting said slider member and the corresponding clamp mounting member whereby the relative vertical positions of said clamp mounting member and said slider member with respect to an underlying portion of said longitudinal guide bar can be controllably adjusted for frictionally locking same together and can be controllably adjusted in the opposite direction for relatively unlocking same and releasing said slider member for longitudinal movement therealong.

5. Apparatus as defined in claim 1, wherein said longitudinal guide bar is effectively provided adjacent to at least one end thereof with an angle guide member having an inner straight edge positioned at a desired angle relative to said longitudinal guide bar and lying in a horizontal plane immediately thereabove for edge contact with said workpiece whereby to position said workpiece so that said power saw blade will cut another edge of said workpiece which will be at said desired angle relative to said edge of said workpiece adapted to abut said inner straight edge of said angle guide member.

6. Power saw guide apparatus adapted to slidably cooperate with a power saw table having a longitudinal slot formed on the upper surface thereof and having a power saw blade positioned in a plane parallel to the longitudinal direction of said longitudinal slot and laterally offset therefrom in a direction perpendicular thereto by a predetermined offset distance and adapted to hold a workpiece which is to be sawed for movement thereof relative to said power saw blade in a direction parallel to said longitudinal slot, comprising: a longitudinal guide bar having a bottom portion having a cross-sectional shape similar to said longitudinal slot formed in the upper surface of said saw table parallel to and laterally offset from said power saw blade and adapted to be slidably inserted into and received by said longitudinal slot for manually controlled movement along the length thereof, one end of said longitudinal guide bar being provided with a clamp mounting member having a vertically spaced inwardly directed portion threadedly provided with a downwardly vertically directed controllably threadedly vertically adjustable threaded clamp member adapted for controllably releasably clamping end edge portion of a workpiece in fixed relationship with respect to said clamp member and with respect to an underlying portion of said longitudinal guide bar, an opposite end of said longitudinal guide bar also being provided with a clamp mounting member having a vertically spaced inwardly directed portion threadedly provided with a downwardly vertically directed controllably threadedly vertically adjustable threaded clamp member adapted for controllably releasably clamping an opposite edge portion of said workpiece in a fixed relationship with respect to said clamp member and with respect to an underlying portion of said longitudinal guide bar, at least one of said clamp mounting members being provided with controllably lockable and unlockable slidable engagement coupling means effectively coupling same with respect to the corresponding end portion of said longitudinal guide bar for controllable unlocking thereof and for relative longitudinal slidable movement of said clamp mounting member along a portion of the length of said longitudinal guide bar and for subsequent locking of said slidable engagement coupling means in a selected relative position thereof with respect to said longitudinal guide bar for facilitating engagement of the corresponding one of said clamp members with the corresponding edge of said workpiece irrespective of the width of said workpiece between said longitudinally spaced clamp members.

7. Apparatus as defined in claim 6, wherein said slidable engagement coupling means comprises a longitudinal retaining keyway slot means formed in the upper surface of said longitudinal guide bar along at least a portion of the length thereof adjacent to the corresponding end thereof and a slider member having downwardly enlarged head means at the bottom thereof slidably and retainingly longitudinally inserted into said longitudinal retaining keyway slot means for relative longitudinal movement therealong.

8. Apparatus as defined in claim 6, wherein said slidable engagement coupling means comprises a longitudinal retaining keyway slot means formed in the upper surface of said longitudinal guide bar along at least a portion of the length thereof adjacent to the corresponding end thereof and a slider member having downwardly enlarged head means at the bottom thereof slidably and retainingly longitudinally inserted into said longitudinal retaining keyway slot means for relative longitudinal movement therealong, said slider member being provided with controllably releasable locking means for relatively locking same with respect to said longitudinal guide bar in any selected position along the length of said longitudinal retaining keyway slot means thereof.

9. Apparatus as defined in claim 6, wherein said slidable engagement coupling means comprises a longitudinal retaining keyway slot means formed in the upper surface of said longitudinal guide bar along at least a portion of the length thereof adjacent to the corresponding end thereof and a slider member having downwardly enlarged head means at the bottom thereof slidably and retainingly longitudinally inserted into said longitudinal retaining keyway slot means for relative longitudinal movement therealong, said slider member being provided with controllably releasable locking means for relatively locking same with respect to said longitudinal guide bar in any selected position along the length of said longitudinal retaining keyway slot means thereof, said controllably releasable locking means comprising at least one threaded member threadedly and controllably adjustably interconnecting said slider member and the corresponding clamp mounting member whereby the relative vertical positions of said clamp mounting member and said slider member with respect to an underlying portion of said longitudinal guide bar can be controllably adjusted for frictionally locking same together and can be controllably adjusted in the opposite direction for relatively unlocking same and releasing said slider member for longitudinal movement therealong.

10. Apparatus as defined in claim 6, wherein said longitudinal guide bar is effectively provided adjacent to at least one end thereof, fastened between said end thereof and a corresponding bottom portion of the clamp mounting member carried thereby, with a right angle guide member having an inner straight edge positioned substantially perpendicular to said longitudinal guide bar and lying in a horizontal plane immediately thereabove for edge contact with said workpiece whereby to position said workpiece so that said power saw blade will cut another edge of said workpiece which will be perpendicular to said edge of said workpiece adapted to abut said inner straight edge of said right angle guide member.

References Cited by the Examiner
UNITED STATES PATENTS

| | | | |
|---|---|---|---|
| 586,695 | 7/1897 | Saxton | 143—168 |
| 2,759,503 | 8/1956 | Goldschmidt | 143—51 |

WILLIAM W. DYER, JR., *Primary Examiner.*

W. D. BRAY, *Assistant Examiner.*